(12) United States Patent
Nguyen et al.

(10) Patent No.: US 7,024,583 B2
(45) Date of Patent: Apr. 4, 2006

(54) METHOD AND APPARATUS FOR DETECTING FILE SYSTEM CORRUPTION

(75) Inventors: Liem M. Nguyen, Roseville, CA (US); Thomas Vachuska, Roseville, CA (US); Fengliang Hu, North Highlands, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 559 days.

(21) Appl. No.: 10/284,255

(22) Filed: Oct. 31, 2002

(65) Prior Publication Data

US 2004/0088608 A1    May 6, 2004

(51) Int. Cl.
*G06F 11/00* (2006.01)
(52) U.S. Cl. .......................................... 714/5; 707/202
(58) Field of Classification Search ................... 714/5, 714/7, 8, 15, 16, 20, 57, 49; 707/202, 200, 707/205; 711/119, 120
See application file for complete search history.

(56) References Cited

U.S. PATENT DOCUMENTS

| | | | | |
|---|---|---|---|---|
| 5,459,857 A | * | 10/1995 | Ludlam et al. | 714/6 |
| 5,761,409 A | | 6/1998 | Testardi | 395/183.15 |
| 6,012,114 A | | 1/2000 | Autor et al. | 710/103 |
| 6,035,425 A | | 3/2000 | Caldwell et al. | 714/52 |
| 6,195,767 B1 | * | 2/2001 | Adams | 714/47 |
| 6,400,785 B1 | | 6/2002 | Sunaga et al. | 375/372 |
| 6,530,038 B1 | * | 3/2003 | Hughes et al. | 714/15 |
| 6,732,124 B1 | * | 5/2004 | Koseki et al. | 707/202 |
| 2004/0015762 A1 | * | 1/2004 | Klotz et al. | 714/742 |
| 2004/0015908 A1 | * | 1/2004 | Giel et al. | 717/141 |

* cited by examiner

*Primary Examiner*—Nadeem Iqbal

(57) ABSTRACT

The system and method described herein automatically detect various corruptions in a file system and notify a system administrator of the corruption. Detailed information on the file system is collected by a probe process. If the file system is corrupt or inaccessible, the system and method marks the file system as bad, notifies the system administrator and then ceases to attempt to collect information on that system again until it has been repaired.

25 Claims, 2 Drawing Sheets

METHOD AND APPARATUS FOR DETECTING FILE SYSTEM CORRUPTION

BACKGROUND

In the course of operating a computer on a network, computer application processes need to access the host computer's file system through a variety of system calls. In systems of the prior art, when the file system is corrupt, the software requesting access to a file system resource will hang, often with no way to be killed, or terminated. Problem elements of the file system are bad disk sectors, bad inode table, full inode table, bad FAT tables, etc. Once the software hangs, it is necessary for the user to reboot the system in order to resume. The system is rebooted so that the operating system (OS) will exclude the corrupt file system from being mounted. Once the software hangs, it usually requires a user to personally either reboot the system or repair the corrupted file system.

Problems with a corrupt file system are even more critical with the widespread use of storage area networks (SANs). More and more network devices now attempt to access storage file systems of the SAN. The benefits of SANs, e.g., storage scalability, availability, and flexibility, are becoming clearer as the entire IT industry adopts this storage topology. As SANs grow to accommodate the growth in storage requirements, the task of managing this business-critical resource, without increasing staff, becomes daunting.

To help customers manage their SANs, a powerful, integrated suite of SAN-management software products, collectively called OpenView Storage Area Manager (OVSAM), have been developed and are available through the Hewlett-Packard Company. These products provide a single, centralized solution for managing a SAN. The products automatically discover storage devices, interconnect devices, and hosts, to enable a user to proactively manage more storage with less effort.

SUMMARY

The system and method described herein automatically detect various corruptions in a file system and notify a system administrator of the corruption. Detailed information on the file system is collected by a probe process. If the file system is corrupt or inaccessible, the system and method marks the file system as bad, notifies the system administrator and then ceases to attempt to collect information on that system again until it has been repaired.

DESCRIPTION OF THE DRAWINGS

The detailed description will refer to the following drawings, wherein like numerals refer to like elements, and wherein.

DETAILED DESCRIPTION

A feature of the apparatus and method described herein is to probe the health status of a system. Probing of the file system is done by appending data to an opened data file. The file is opened by a probe process. If appending data to an opened data file is successful within an adjustable time interval (e.g., PROBE_INTERVAL, where the default is 1 second), the file system is considered to be functioning well and responsive to the users. If a file system doesn't respond to the outside users within the time interval, the probe will then continue for a specified number of tries (e.g., MAX_PROBE, where the default is 300 times). If the file system is still not able to append data to the opened data file after the selected time period of PROBE_INTERVAL*MAX_PROBE, the file system is considered as corrupted.

Figure 1:
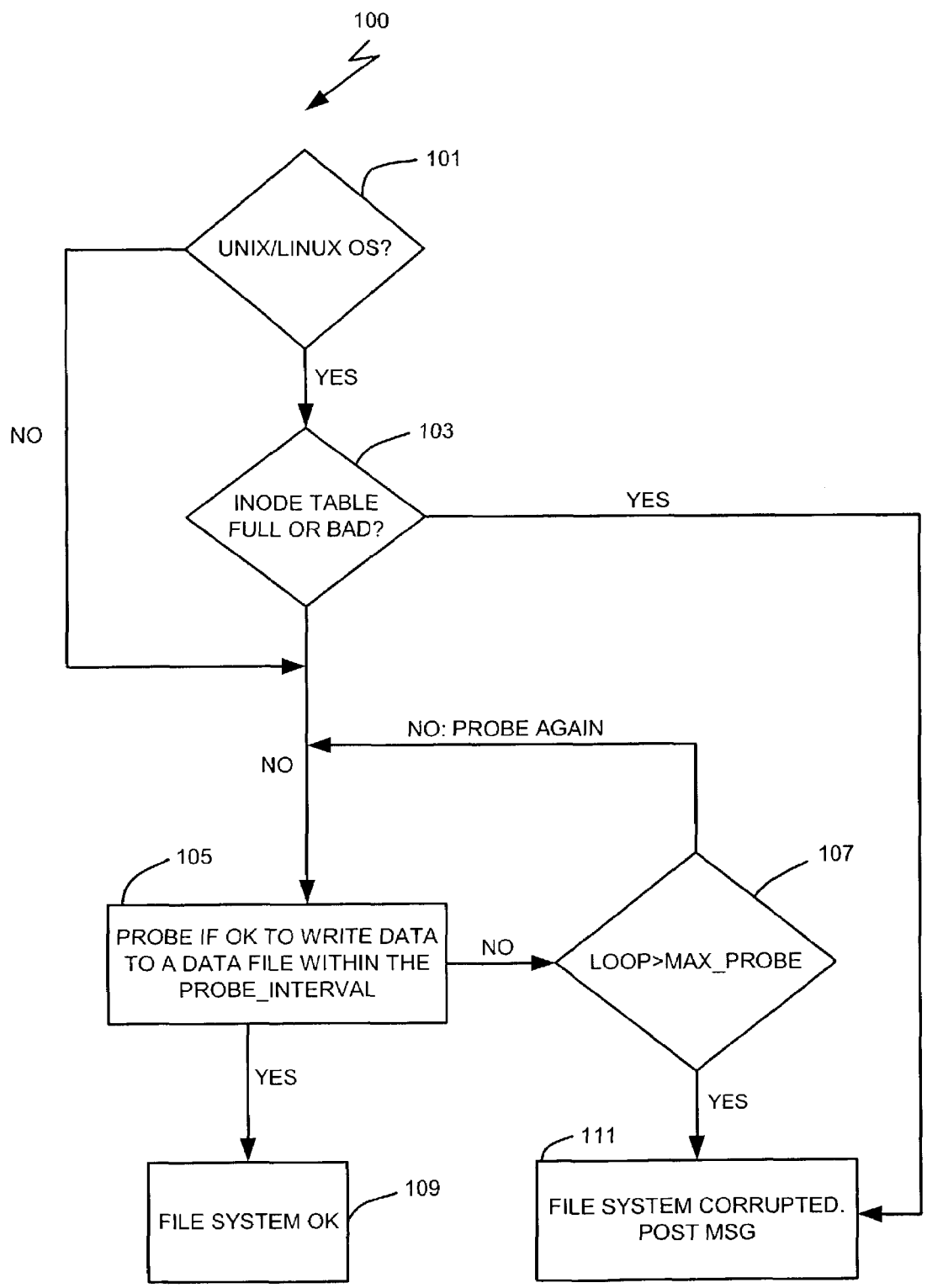
FIG. 1 illustrates a flow diagram of an exemplary process to monitor a file system for corruption.

Referring now to FIG. 1, there is shown a flow diagram of an exemplary method, generally designated by the reference numeral 100, for probing a file system to detect corruption therein. The described method operates on various operating systems, but each operating system has its own indicators of file system corruption. For instance, Unix and Linux use an inode table. If the operating system of the target computer is Unix or Linux, as determined in step 101, then a determination is made as to whether the inode table is full or bad, in step 103. It will be apparent to one of ordinary skill in the art that step 103 can be customized for any operating system that has unique indicators of file system corruption. For instance, for a Windows™ operating system, the FAT table is checked. Inode or FAT table checking is different from appending data to the opened file. Operating System APIs are relied upon to find out such information. Further, there are other reasons why a file system is corrupted that are tested, for instance, if someone pulls out the hard disk prematurely. If the test for a bad table fails, then the probe process attempts to append data to an opened file on the file system, in step 105. The probe process basically tries to collect some basic file information by attempting the write/append: the probe process basically tries to probe the health status of the file system by appending data to an opened file. If the process doesn't come back right away (within PROBE_INTERVAL*MAX_PROBE time), then the process streams bytes back to the main process. If the same number of bytes is not received back within a certain amount of time, then the file system can be marked as corrupted. If the write is successful within the specified time interval, PROBE_INTERVAL, then the file system is declared okay, in step 109. If the write is not successful in the specified time, then it is determined whether the number of tries exceeds the maximum specified, MAX_PROBE, in step 107. If the maximum number of tries has been exceeded without a successful write/append, or the inode table was full or bad, then a file system corrupted message is posted to the system administrator, in step 111. If the maximum number of tries has not been exceeded, then the probe process continues at step 105 to attempt another write/append.

The exemplary method uses two time out thresholds to make this detection mechanism both responsive and generic. If a file system works well, the detection returns fairly quickly, i.e., within the PROBE_INTERVAL. If a file system fails to write data, e.g., within the afore-mentioned the MAX_PROBE=300 seconds, it is fairly safe to assume that file system is in bad shape for some reason. In an exemplary embodiment, the two time out thresholds (PROBE_INTERVAL and MAX_PROBE) are configurable to handle the extreme case that a file system works but does not write data to the data file within a default time, for instance, if the system load is extremely heavy. Thus, the threshold, MAX_PROBE, can be set to a bigger number. To make the probing more responsive, PROBE_INTERVAL can be set to a small number, for instance, 100 milliseconds.

In one embodiment, this implementation of the file system corruption mechanism is incorporated into the Storage Builder of Open View Storage Area Management (OVSAM) 3.0. As before, default thresholds (PROBE_INTERVAL=1 second and MAX_PROBE=300) are used in the tests. The probe process is always on during a file collection, to make sure the process will not hang. In this embodiment, when there is no need to collect data for an OVSAM Storage Builder, the probe process is turned off. When the corrupted file system is fixed, the probe process can be notified via the a graphic user interface or command line interface (GUI/CLUI) to enable file collection on that corrupted file system again.

The present system and method is system-independent. One embodiment is written in JAVA™ and has different native codes for Windows™ and UNIX. In an exemplary embodiment, the probe process is implemented as native code on UNIX and Windows™ using C to append data to an opened data file. The file system corruption detection framework in this embodiment is written as Java™ code.

Figure 2:
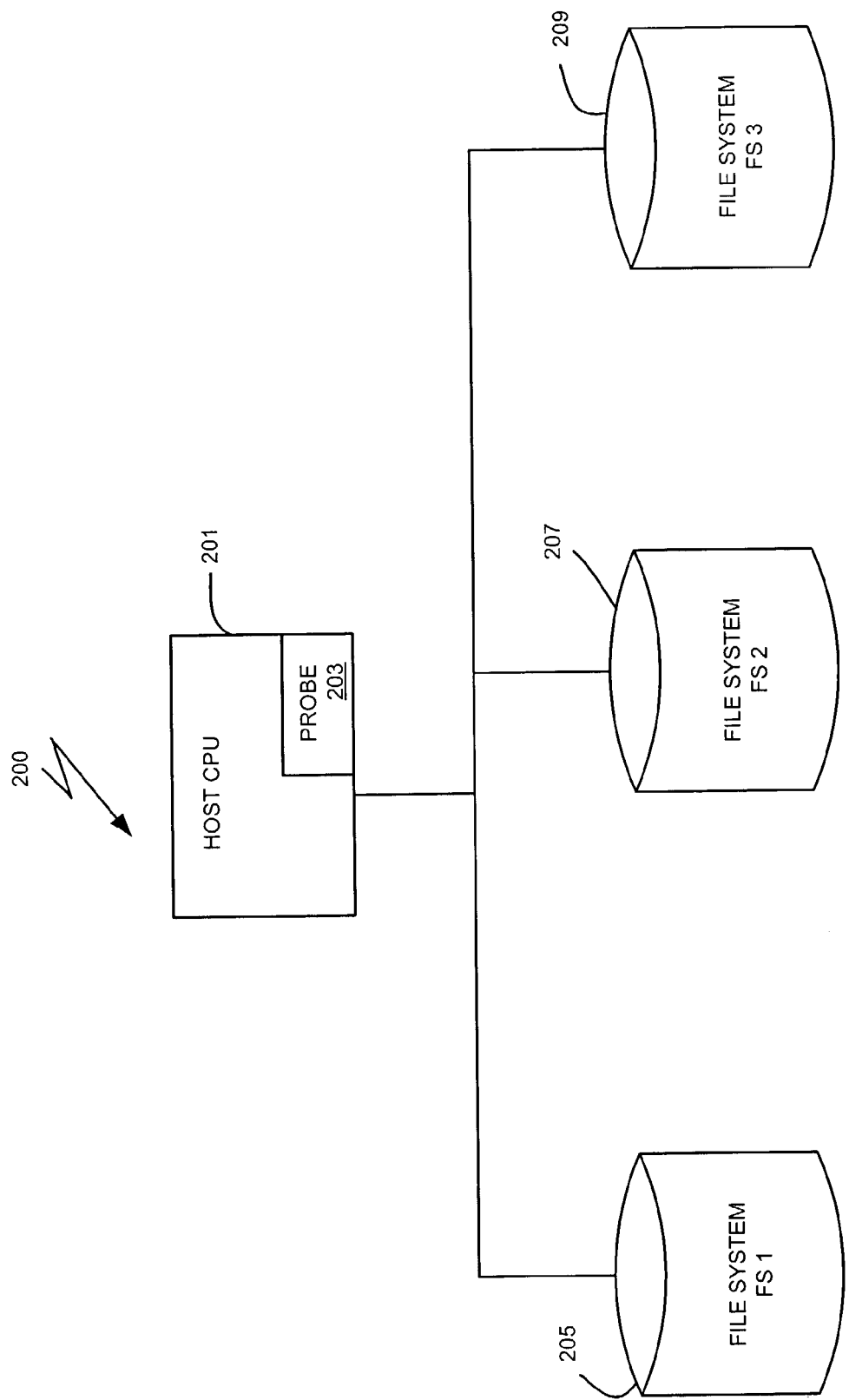
FIG. 2 is block diagram showing an exemplary storage area network with three file systems.

Referring now to FIG. 2, there is shown an exemplary storage area network 200 having several file systems. In the exemplary network 200, a host CPU 201 is connected to a network of file systems 205, 207, and 209. Suppose that file system FS1 205 has become corrupt. If the host CPU 201 tries to access file system FS1 205, it will be unable to do so, and the application requiring access to FS1 205 will typically hang and never return. It is advantageous for the applications to know when a file system is corrupt to bypass it or more quickly return from an operation. The probe process 203 runs on a host CPU 201, which has three file systems mounted 205, 207, and 209, respectively. The probe process 203 creates a data file on each file system and appends data to each to probe the status of the file system. As described above, the file system is considered to be corrupted if the appending is unsuccessful within the interval of PROBE_INTERVAL*MAX_PROBE.

The probe process software goes out to all of the attached file systems and retrieves information to find out how much capacity is left on the respective file systems. This process sends out an event and a desired action associated with the event. The action is user selectable, and can be e-mailing, paging or just appearing as a warning on the application process. The probe process is always on when a file collection is performed as a safeguard to make sure the application software does not hang. Once a corrupt file system is fixed, the user can check this file system, and then the disks of file systems will be collected on again.

It will be apparent to one skilled in the art that the described system and method is scalable to multiple file systems on a network of computers. The probe process will typically reside on the host computer that controls a given file system. However, any computer on the network that can run the operating system APIs on the file systems can host the probe process.

As noted, an advantage of this corrupted file system detection is that it is system-independent. The same concept carries over to all the file systems. Another advantage is using a multi-level time-out mechanism. Such mechanisms have the great advantage that not much performance penalty is brought to a good file system, and a corrupted file system can be detected quite fast. A further advantage is that the time-out thresholds are user-selectable. Thus, the time-outs are adaptable for different work loads.

The terms and descriptions used herein are set forth by way of illustration only and are not meant as limitations. Those skilled in the art will recognize that many variations are possible within the spirit and scope of the invention as defined in the following claims, and their equivalents, in which all terms are to be understood in their broadest possible sense unless otherwise indicated.

The invention claimed is:

1. A method for detecting corrupt file systems, comprising:
    identifying an operating system running on a host, the host attached to at least one file system;
    performing file system probes on the at least one file system, the respective file system probes being dependent on operating system type;
    testing each of the at least one file system for responsiveness by appending an open file on each said at least one file system using a multi-level time-out mechanism, wherein the multi-level time-out mechanism comprises a user selectable interval for attempting an append and a user selectable maximum number of tries to attempt a successful append; and
    sending, if one of the testing of the corrupt file systems exceeds the maximum number of probe tries at the selected probe interval and the file system probes identify file corruption, a notification that a given file system is corrupt.

2. The method as recited in claim 1, wherein if the operating system type is UNIX, the file system probe identifies corruption of the host's inode table.

3. The method as recited in claim 1, wherein if the operating system type is Windows.TM., the file system probe identifies corruption of the host's FAT table.

4. The method as recited in claim 1, wherein the selected probe interval is one second, and is reconfigurable for different computation loads.

5. The method as recited in claim 1, wherein the selected number of probe tries is 300, and is reconfigurable for different computation loads.

6. The method as recited in claim 1, wherein sending a notification further comprises:
    creating an event; and
    performing an action corresponding to the event, wherein the action is selected from the group consisting of actions of e-mailing a file system corruption notification, paging at least one selected individual, and posting a warning to an application process.

7. The method as recited in claim 1, further comprising identifying corruption in a file system using operating system application program interface (API) code to retrieve file system information.

8. A file system corruption detection mechanism operating on a network of computers, comprising:
    means for probing a plurality of file systems on a computer network, wherein the means for probing tests the file system for corruption, and if probing fails to identify corruption, attempts to append data to an open file on a probed file system;
    means for determining whether a maximum number of append tries has been reached, wherein each append try on a file system is separated by a user selectable interval;
    means for determining whether a probed file system is corrupted; and
    means for notifying a user of a corrupted file system.

9. The mechanism as recited in claim 8, wherein the maximum number of append tries is 300.

10. The mechanism as recited in claim 8, wherein the user selectable interval is one second.

11. The mechanism as recited in claim 8, wherein the means for notifying a user generates an event, the event corresponding to an action selected from the group of actions consisting of e-mailing a file system corruption notification, paging at least one selected individual, and posting a warning to an application process.

12. The mechanism as recited in claim 8, wherein the means for probing is customizable for an operating system type, and wherein for an operating system type of UNIX, the means for probing identifies corruption of the host's inode table.

13. The mechanism as recited in claim 8, wherein the means for probing is customizable for an operating system type, and wherein for an operating system type of Windows™, the probes identify corruption of the host's FAT table.

14. A file system corruption detector running on a host computer, comprising:
   system independent computer code for identifying system unique identifiers for detecting file system corruption; and
   computer code for running a probe process, wherein the probe process opens a file on at least one file system connected to the host computer and wherein the probe process attempts to append data to the opened file, and wherein the probe process uses a multi-level time-out mechanism to determine whether the probed file system is functioning adequately, wherein the multi-level time-out mechanism comprises a user selectable interval for attempting and append and a user selectable maximum number of times to attempt a successful append.

15. The file system corruption detector as recited in claim 14, further comprising means for performing an action if a file system is corrupted.

16. The file system corruption detector as recited in claim 15, wherein the performed action is selected form the group consisting of actions of e-mailing a file system corruption notification, paging at least one selected individual, and posting a warning to an application process.

17. The file system corruption detector as recited din claim 15, wherein each file system connected to the host is probed, and wherein the performed action removes the detected corrupt file system for probed file systems until the corrupt file system has been repaired.

18. The file system corruption detector as recited in claim 17, wherein when a corrupt file system has been repaired, it is probed by the probe process.

19. A file system corruption detector running on a host computer, comprising:
   system independent computer code for identifying system unique identifiers for detecting file system corruption; and
   computer code for running a probe process, wherein the probe process runs on the host computer and opens a file on a least one file system, wherein the probe process attempts to append data to the opened file, wherein the probe process uses a multi-level time-out mechanism to determine whether the probed file system is functioning adequately, and wherein the multi-level time-out mechanism comprises a user selectable interval for attempting an append and a user selectable maximum number of times to attempt a successful append.

20. The file system corruption detector as recited in claim 19, wherein the host computer is connected to at least one system over a computer network, and the probe process accesses the at least one file system over the computer network.

21. The file system corruption detector as recited in claim 20, further comprising means for performing an action if s file system is corrupted.

22. The file system corruption detector as recited in claim 21, wherein the performed action is selected from the group consisting of actions of e-mailing a file system corruption notification, paging at least one selected individual, and posting a warning to an application process.

23. A computer readable medium containing computer code for detecting file system corruption on a host computer, the medium comprising:
   a first section of system independent computer code for identifying system unique identifiers for detecting file system corruption; and
   a second section of computer code for running a probe process, wherein the probe process opens a file on at least one file system connected to the host computer, wherein the probe process attempts to append data to the opened file, wherein the probe process uses a multi-level time-out mechanism to determine whether the probed file system is functioning adequately, and wherein the multi-level time-out mechanism comprises a user selectable interval for attempting an append and a user selectable maximum number of times to attempt a successful append.

24. The computer readable medium as recited in claim 24, further comprising a section of computer code for performing an action if a file system is corrupted.

25. The computer readable medium as recited claim 24, wherein the performed action is selected from the group consisting of actions of e-mailing a file system corruption notification, paging at least one selected individual, and posting a warning to an application process.

* * * * *